United States Patent
Ueno

(10) Patent No.: US 10,091,378 B2
(45) Date of Patent: Oct. 2, 2018

(54) OPTICAL SCANNING DEVICE THAT RADIATES A PLURALITY OF LASER BEAMS AND METHOD OF OPERATING THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Sueo Ueno, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/381,846

(22) Filed: Dec. 16, 2016

(65) Prior Publication Data

US 2017/0180583 A1  Jun. 22, 2017

(30) Foreign Application Priority Data

Dec. 16, 2015 (JP) ................................. 2015-245606

(51) Int. Cl.
| H04N 1/04 | (2006.01) |
| H04N 1/00 | (2006.01) |
| H04N 1/028 | (2006.01) |
| H04N 1/06 | (2006.01) |
| H04N 1/29 | (2006.01) |

(52) U.S. Cl.
CPC ....... *H04N 1/00933* (2013.01); *H04N 1/0283* (2013.01); *H04N 1/06* (2013.01); *H04N 1/29* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| 7,170,536 B2 * | 1/2007 | Inagawa | ............ H04N 1/40025 347/133 |
| 2005/0206718 A1 * | 9/2005 | Komiya | ................... B41J 2/471 347/246 |

(Continued)

FOREIGN PATENT DOCUMENTS

JP  2016-090757  5/2016

*Primary Examiner* — Dung D Tran
(74) *Attorney, Agent, or Firm* — Amin, Turocy & Watson LLP

(57) ABSTRACT

An optical scanning device according to an embodiment includes a light source, a MEMS mirror, a MEMS-mirror driving unit, a control unit, and a sensor. The light source radiates a plurality of laser beams that scan a photoconductive drum. The MEMS mirror includes a reflection surface that reflects the plurality of laser beams radiated from the light source. The MEMS-mirror driving unit reciprocatingly moves the MEMS mirror. The sensor supplies a horizontal synchronization signal to the control unit by detecting the laser beam reflected on the reflection surface when the MEMS mirror reaches a predetermined position. After detecting the horizontal synchronization signal supplied from the sensor, the control unit performs the auto power control of the light amount of at least one laser beam among the plurality of laser beams.

20 Claims, 6 Drawing Sheets

(56) References Cited

U.S. PATENT DOCUMENTS

| | | | | |
|---|---|---|---|---|
| 2008/0151036 A1* | 6/2008 | Iwai | ................. | B41J 2/471 347/260 |
| 2014/0363207 A1* | 12/2014 | Matsumoto | ........ | G06K 15/1219 399/220 |
| 2015/0278659 A1* | 10/2015 | Yano | ................. | G06K 15/1843 358/1.9 |
| 2015/0338765 A1* | 11/2015 | Akagi | ................. | H04N 1/113 347/118 |

* cited by examiner

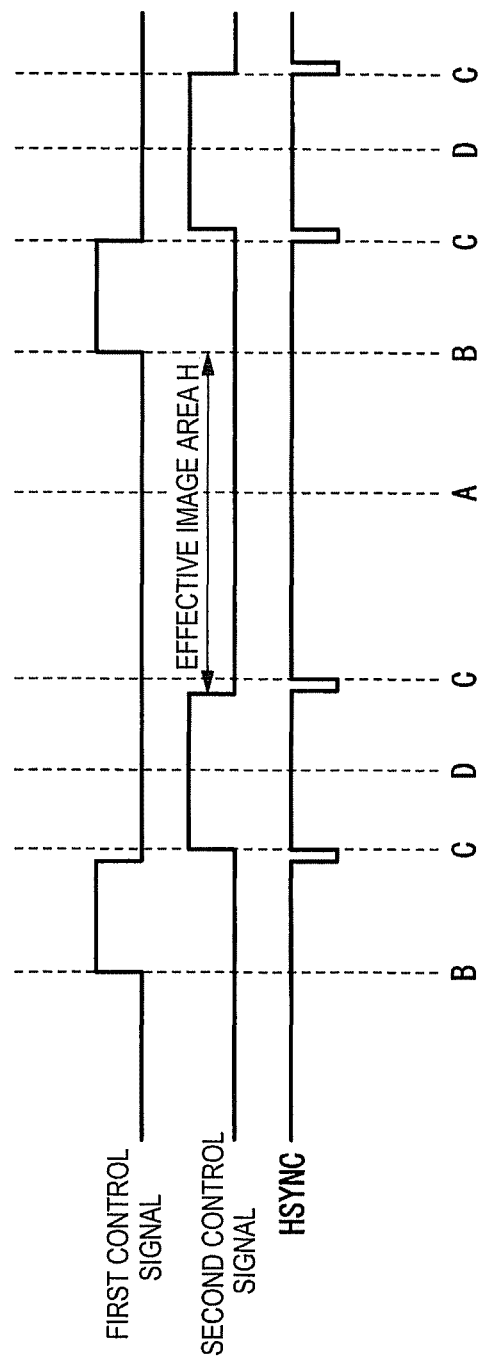

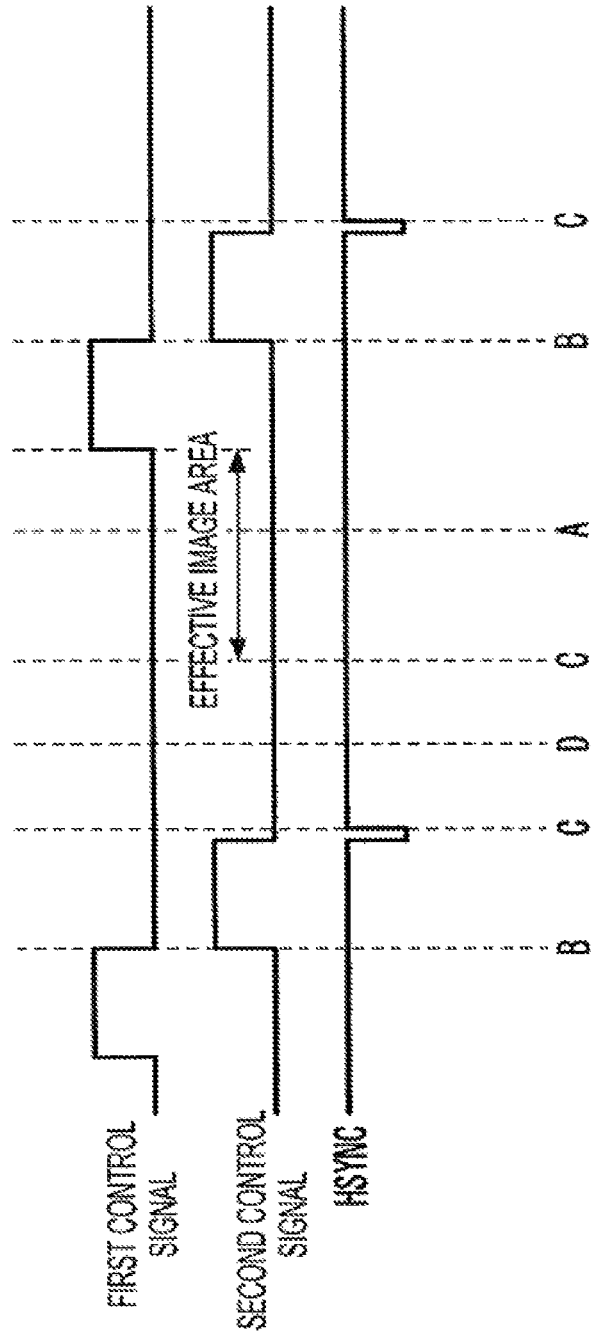

OPTICAL SCANNING DEVICE THAT RADIATES A PLURALITY OF LASER BEAMS AND METHOD OF OPERATING THE SAME

CROSS-REFERENCE TO RELATED APPLICATIONS

This application is based upon and claims the benefit of priority from Japanese Patent Application No. 2015-245606, filed Dec. 16, 2015, the entire contents of which are incorporated herein by reference.

FIELD

Embodiments described herein relate generally to an optical scanning device and an optical scanning method.

BACKGROUND

In an image forming apparatus, a MEMS (Micro Electro Mechanical Systems) mirror is used in an optical scanning device that forms an electrostatic latent image on a photoconductive drum. The optical scanning device reciprocatingly moves the MEMS mirror and scans a laser beam radiated from a light source onto the photoconductive drum to form an image on the photoconductive drum.

In recent years, for an increase in speed of image formation on a photoconductive drum, a method of radiating a plurality of laser beams. In these methods, the optical scanning device needs to perform APC (Auto Power Control) on a plurality of light sources that radiate the laser beams. Therefore, the time required for the APC increases as the number of light sources increases. The APC needs to be carried out when laser beams are not radiated on the photoconductive drum. However, since a distance of the reciprocating movement of the MEMS mirror is mechanically determined, an effective image area sometimes decreases as the time required for the APC increases.

DESCRIPTION OF THE DRAWINGS

FIG. 5 is a timing chart for explaining the processing of the APC of the light emitting units in the optical device; and FIG. 6 is a timing chart for explaining processing of APC of two light emitting units in an optical scanning device in the past.

DETAILED DESCRIPTION

An aspect of the present invention is to provide an optical scanning device and an optical scanning method that can suppress an effective image area from decreasing when a plurality of laser beams are used.

In general, according to one embodiment, an optical scanning device includes a light source, a MEMS mirror, a MEMS-mirror driving unit, a control unit, and a sensor. The light source radiates a plurality of laser beams that scan a photoconductive drum. The MEMS mirror includes a reflection surface that reflects the plurality of laser beams radiated from the light source. The MEMS-mirror driving unit reciprocatingly moves the MEMS mirror. The control unit performs auto power control for controlling respective light amounts of the plurality of laser beams radiated from the light source to predetermined values. The sensor supplies a horizontal synchronization signal to the control unit by detecting the laser beam reflected on the reflection surface when the MEMS mirror reaches a predetermined position. After the scanning/radiation and after detecting the horizontal synchronization signal supplied from the sensor, the control unit performs the auto power control of the light amount of at least one laser beam among the plurality of laser beams.

An optical scanning device in an embodiment is explained with reference to the drawings.

Figure 1:
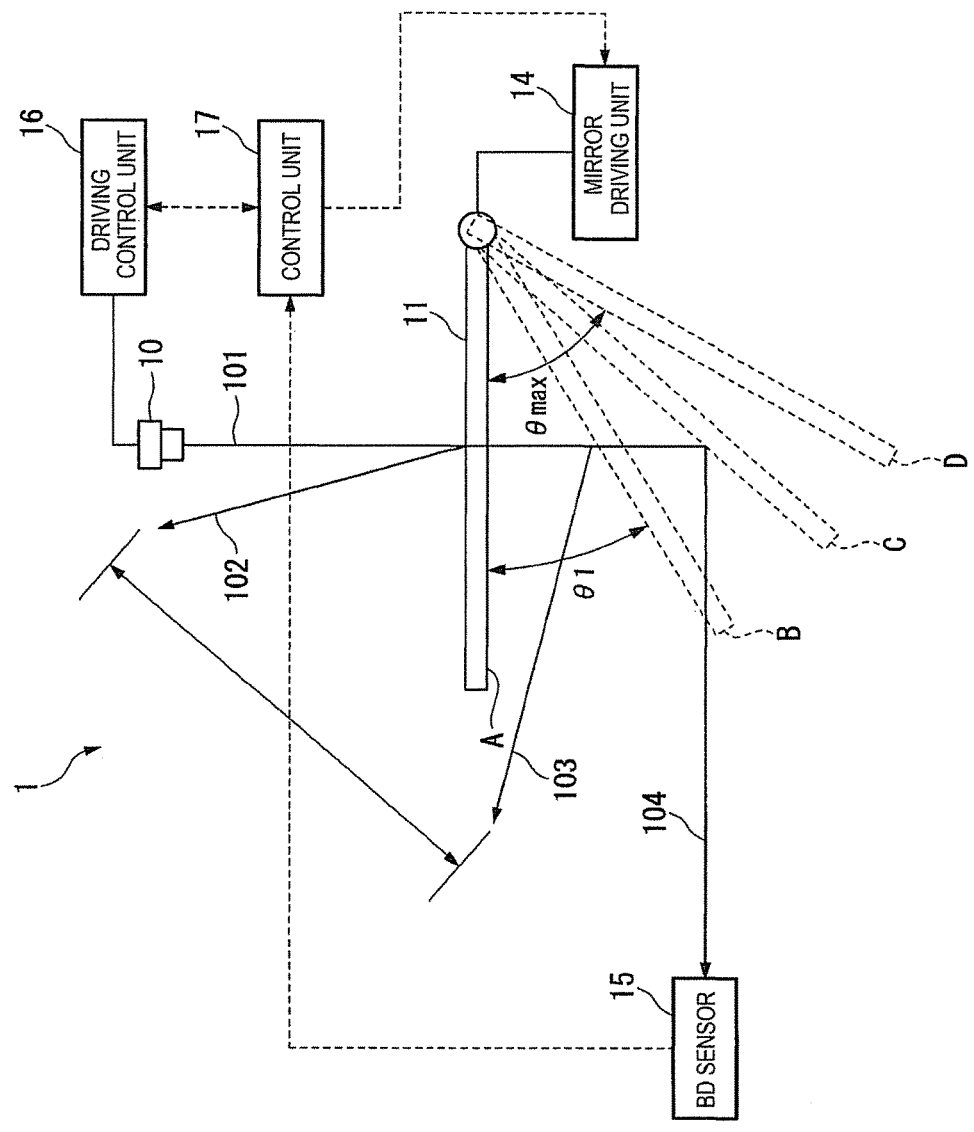
FIG. 1 is a diagram showing an example of the schematic configuration of an optical scanning device in an embodiment.

FIG. 1 is a schematic configuration diagram showing an example of an optical scanning device 1 in an embodiment. For example, the optical scanning device 1 is used in an image forming apparatus. For example, the image forming apparatus is a multi-function peripheral (MFP).

The optical scanning device 1 emits a plurality of laser beams modulated on the basis of an image signal read by the image forming apparatus. The optical scanning device 1 reflects the emitted plurality of laser beams on a reciprocatingly moving MEMS mirror 11. The optical scanning device 1 radiates the reflected laser beams on the surface of a photoconductive drum to scan (exposes) the surface of the photoconductive drum. The laser beams are radiated on the surface of the photoconductive drum, whereby an electrostatic latent image is formed on the surface of the photoconductive drum. Light amounts of laser beams radiated from a light source change according to aged deterioration of the light source, an ambient temperature change, and the like. Therefore, the optical scanning device 1 performs APC (Auto Power Control) for keeping the light amounts of the laser beams constant. After the scanning and after detecting a horizontal synchronization signal, the optical scanning device 1 in this embodiment performs the auto power control of the light amount of at least one laser beam. Note that the APC is carried out when the laser beams are not radiated on an effective image area on the photoconductive drum. The effective image area is an area to be exposed on the photoconductive drum and is an area where the laser beams are radiated on the photoconductive drum. The optical scanning device 1 in this embodiment is specifically explained below.

The optical scanning device 1 includes a light source 10, the MEMS mirror 11, a MEMS-mirror driving unit 14, a BD (beam detect) sensor 15, a driving control unit 16, and a control unit 17.

The light source 10 includes a light emitting element that emits a laser beam 101. For example, the light source 10 includes a laser diode as the light emitting element. The laser beam 101 emitted from the light source 10 is reflected on the MEMS mirror 11 and forms an image on the photoconductive drum. For example, the light source 10 is disposed on the outer side of an area where the optical scanning device 1 performs main scanning.

The MEMS mirror 11 is disposed in an emitting direction of a laser beam. Positions A to D of the MEMS mirror 11 shown in FIG. 1 indicate any positions of the MEMS mirror 11 driven by the MEMS-mirror driving unit 14. The MEMS mirror 11 reciprocatingly moves between the position A and the position D. That is, the MEMS mirror 11 moves to the position A, the position B, the position C, the position D, the position C, the position B, and the position A in this order. Note that a position where the MEMS mirror 11 starts the movement may be any one of the positions A to D. In this embodiment, in some case, the position A is referred to as first turning point and the position D is referred to as second turning point.

If the MEMS mirror 11 moves from the position A to the position B, the position B of the MEMS mirror 11 is a position where the MEMS mirror 11 is disposed at the end of exposure by the optical scanning device 1. The laser beam 101 radiated from the light source 10 at the end of the exposure is reflected on the MEMS mirror 11 present in the position B. A reflected laser beam 103 is radiated on a position where the optical scanning device 1 ends the main scanning, that is, a scanning end position of the photoconductive drum. Then, the exposure ends.

The position D of the MEMS mirror 11 indicates a maximum position of the MEMS mirror 11. The maximum position is a position of a maximum angle at which the MEMS mirror 11 can be driven to the position A. Therefore, an operation range θmax of the MEMS mirror is a range from the position A to the position D. The position C of the MEMS mirror 11 is a position where the MEMS mirror 11 is disposed between the position B and the position D.

If the MEMS mirror 11 moves from the position D toward the position C, the position C of the MEMS mirror 11 is a position where the MEMS mirror 11 is disposed at the start of the exposure by the optical scanning device 1. That is, a scanning range of the MEMS mirror 11 is a range in which the MEMS mirror 11 moves from the position C to the position A through the position B, turns in the position A, and reaches the position B again. Note that an area where an image is formed on the photoconductive drum when the MEMS mirror 11 moves to the position C, the position B, the position A, and the position B in this order is referred to as effective image area H.

The MEMS-mirror driving unit 14 controls to drive the MEMS mirror 11 to reciprocatingly move from the position A to the position D. For example, the MEMS-mirror driving unit 14 is an electric motor. The MEMS-mirror driving unit 14 controls the driving of the MEMS mirror 11 on the basis of a motor driving signal supplied from the control unit 17.

The BD sensor 15 detects a laser beam 104 reflected by the MEMS mirror 11 present in the position C. If the BD sensor 15 detects the laser beam 104, the BD sensor 15 outputs an HSYNC (Horizontal Synchronizing signal), which indicates that the laser beam 104 is detected, to the control unit 17. The control unit 17 determines, on the basis of the HSYNC detected by the BD sensor 15, timing when the laser beam 104 starts scanning in a main scanning direction. That is, the BD sensor 15 is set to output the HSYNC to the control unit 17 every time the laser beam 104 performs the scanning once in the main scanning direction.

The driving control unit 16 controls light emission power (a light amount) and light emission timing of the light source 10. The driving control unit 16 performs, on the basis of a control signal from the control unit 17, for each scanning, the APC of a light amount of the laser beam 104 radiated from the light source 10. As explained above, the APC is the control for correcting a light amount of the laser beam 104 radiated from the light source 10 to a predetermined value.

Figure 2:
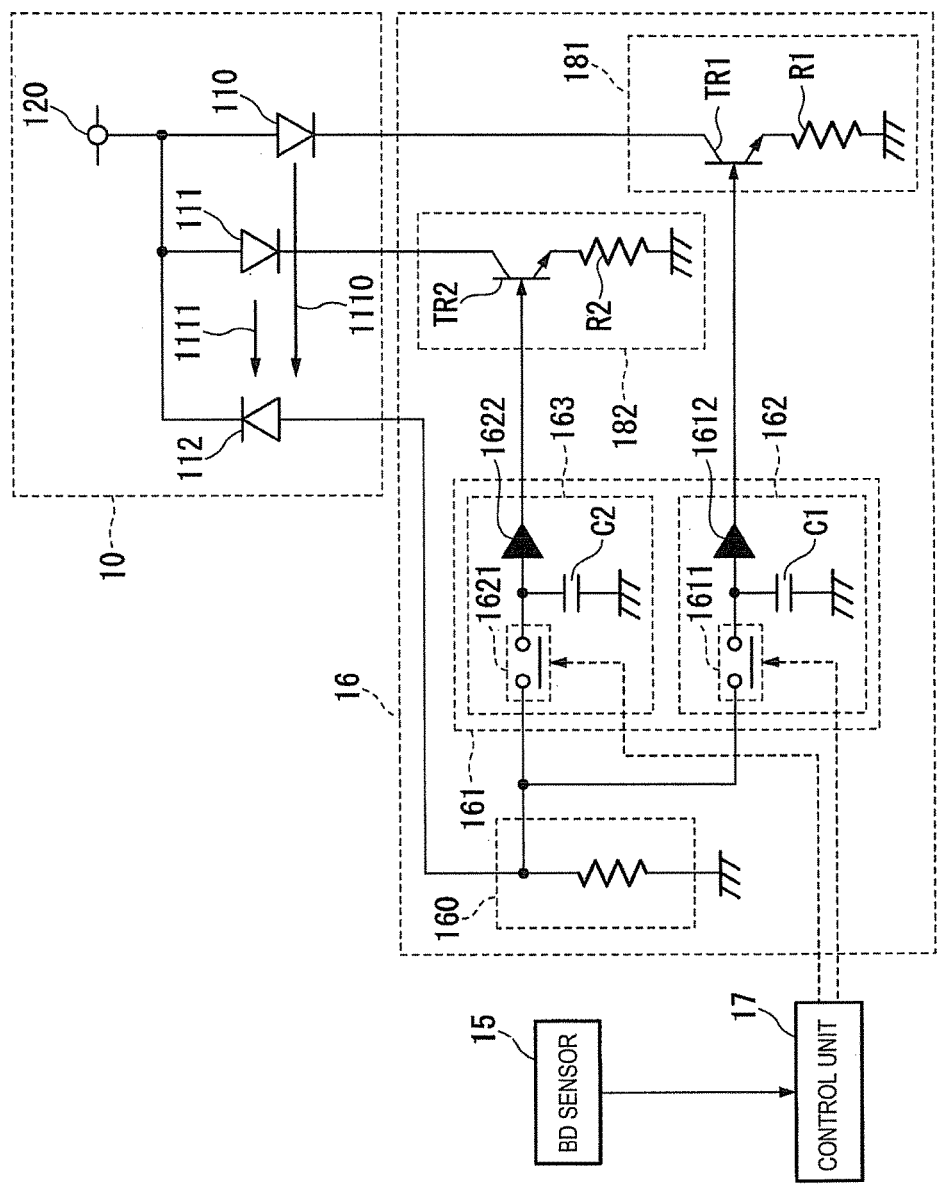
FIG. 2 is a diagram showing an example of the schematic configuration of a light source and a driving control unit of the optical scanning device.

FIG. 2 is a diagram showing an example of the schematic configuration of the light source 10 and the driving control unit 16 of the optical scanning device 1 in the embodiment.

The light source 10 is a multi-laser that radiates a plurality of laser beams. As shown in FIG. 2, in this embodiment, an example is explained in which two light emitting units (a twin laser) are used as the multi laser.

The light source 10 includes a light emitting unit 110, a light emitting unit 111, and a light receiving unit 112.

The light emitting units 110 and 111 radiate laser beams according to output currents of a current source 120 determined on the basis of a driving signal supplied from the driving control unit 16. For example, output currents respectively flowing to the light emitting units 110 and 111 are determined on the basis of a voltage value and a current value of the driving signal.

Simultaneously with emitting the laser beams, the light emitting units 110 and 111 emit laser beams proportional to the emitted laser beams to the light receiving unit 112 side. For example, simultaneously with emitting the laser beam, the light emitting unit 110 emits a laser beam 1110 proportional to the emitted laser beam to the light receiving unit 112 side. Simultaneously with emitting the laser beam, the light emitting unit 111 emits a laser beam 1111 proportional to the emitted laser beam to the light receiving unit 112 side. For example, the light emitting units 110 and 111 are laser diodes. The driving control unit 16 does not simultaneously output driving signals to the light emitting unit 110 and the light emitting unit 111. That is, in the APC, one of the light emitting unit 110 and the light emitting unit 111 radiates a laser beam.

The light receiving unit 112 detects the laser beam 1110 or the laser beam 1111 radiated from the light emitting unit 110 or the light emitting unit 111. For example, the light receiving unit 112 is a photodiode. The light receiving unit 112 supplies an output current corresponding to the detected laser beam 1110 or laser beam 1111 to the driving control unit 16.

The driving control unit 16 includes a current-voltage converting unit 160, an APC control unit 161, a first driving unit 181, and a second driving unit 182.

The current-voltage converting unit 160 converts an output current supplied from the light receiving unit 112 into a voltage. For example, the current-voltage converting unit 160 is a resistor.

The APC control unit 161 controls an output current value of the current source 120 such that a voltage value Vh converted by the current-voltage converting unit 160 coincides with a reference voltage value Vr.

For example, the APC control unit 161 includes a first control unit 162 and a second control unit 163. The first control unit 162 controls an output current value flowing to the light emitting unit 110 such that the voltage value Vh converted by the current-voltage converting unit 160 coincides with the reference voltage value Vr. That is, the first control unit 162 controls a light amount of a laser beam radiated by the light emitting unit 110 to be a predetermined value. The second control unit 163 controls an output current value flowing to the light emitting unit 111 such that the voltage value Vh converted by the current-voltage converting unit 160 coincides with the reference voltage value Vr. That is, the second control unit 163 controls a light amount of a laser beam radiated by the light emitting unit 111 to be a predetermined value.

The first control unit 162 includes a switch unit 1611, a comparator 1612, and a capacitor C1.

The switch unit 1611 changes to an ON state or an OFF state on the basis of a first control signal supplied from the control unit 17. If the switch unit 1611 is in the ON state, the voltage value Vh converted by the current-voltage converting unit 160 is supplied to the comparator 1612. If the switch unit 1611 is in the OFF state, the voltage value Vh converted by the current-voltage converting unit 160 is not supplied to the comparator 1612. If the voltage value Vh converted by the current-voltage converting unit 160 is supplied to the comparator 1612, the capacitor C1 stabilizes the voltage value Vh converted by the current-voltage converting unit 160.

The comparator 1612 compares the voltage value Vh converted by the current-voltage converting unit 160 and the reference voltage value Vr, which is a voltage value corresponding to a desired light emission amount. The comparator 1612 outputs a first driving signal to the first driving unit 181 on the basis of a result of the comparison. For example, if the voltage value Vh is larger than the reference voltage value Vr, the comparator 1612 outputs the first driving signal to the first driving unit 181 to reduce an output current flowing to the light emitting unit 110. For example, if the voltage value Vh is smaller than the reference voltage value Vr, the comparator 1612 outputs the first driving signal to the first driving unit 181 to increase the output current flowing to the light emitting unit 110. It is possible to keep a light amount of a laser beam of the light emitting unit 110 constant according to this processing.

The second control unit 163 includes a switch unit 1621, a comparator 1622, and a capacitor C2.

The switch unit 1621 changes to an ON state or an OFF state on the basis of a second control signal supplied from the control unit 17. If the switch unit 1621 is in the ON state, the voltage value Vh converted by the current-voltage converting unit 160 is supplied to the comparator 1622. If the switch unit 1621 is in the OFF state, the voltage value Vh converted by the current-voltage converting unit 160 is not supplied to the comparator 1622. If the voltage value Vh converted by the current-voltage converting unit 160 is supplied to the comparator 1622, the capacitor C2 stabilizes the voltage value Vh converted by the current-voltage converting unit 160. Note that the switch unit 1611 and the switch unit 1621 may be configured by one three-terminal switch.

The comparator 1622 compares the voltage value Vh converted by the current-voltage converting unit 160 and the reference voltage value Vr, which is a voltage value corresponding to a desired light emission amount. The comparator 1622 outputs a second driving signal to the second driving unit 182 on the basis of a result of the comparison. For example, if the voltage value Vh is larger than the reference voltage value Vr, the comparator 1622 outputs the second driving signal to the second driving unit 182 to reduce an output current flowing to the light emitting unit 111. For example, if the voltage value Vh is smaller than the reference voltage value Vr, the comparator 1622 outputs the second driving signal to the second driving unit 182 to increase the output current flowing to the light emitting unit 111. It is possible to keep a light amount of a laser beam of the light emitting unit 111 constant according to this processing.

The first driving unit 181 controls, on the basis of the first driving signal supplied from the first control unit 162, the output current flowing to the light emitting unit 110. For example, the first driving unit 181 includes a transistor TR1 and a resistor R1. The transistor TR1 adjusts, on the basis of the first driving signal supplied from the first control unit 162, the output current flowing to the light emitting unit 110. The resistor R1 is a limiting resistor that limits the output current flowing to the light emitting unit 110.

The second driving unit 182 controls, on the basis of the second driving signal supplied from the second control unit 163, the output current flowing to the light emitting unit 111. For example, the second driving unit 182 includes a transistor TR2 and a resistor R2. The transistor TR2 adjusts, on the basis of the second driving signal supplied from the second control unit 163, the output current flowing to the light emitting unit 111. The resistor R2 is a limiting resistor that limits the output current flowing to the light emitting unit 111.

The control unit 17 outputs the first control signal or the second control signal to the APC control unit 161 on the basis of the HSYNC supplied from the BD sensor 15. That is, the control unit 17 switches the APC of the light emitting unit 110 and the APC of the light emitting unit 111 on the basis of the HSYNC. Specifically, after the exposure on the photoconductive drum ends, the control unit 17 executes the APC of the light emitting unit 110. After performing detection of the HSYNC during the execution of the APC of the light emitting unit 110, the control unit 17 ends the APC of the light emitting unit 110 and executes the APC of the light emitting unit 111. If the control unit 17 detects the HSYNC again after the MEMS mirror 11 turns in the position D, the control unit 17 ends the APC of the light emitting unit 111 and starts the exposure on the photoconductive drum.

Figure 3:
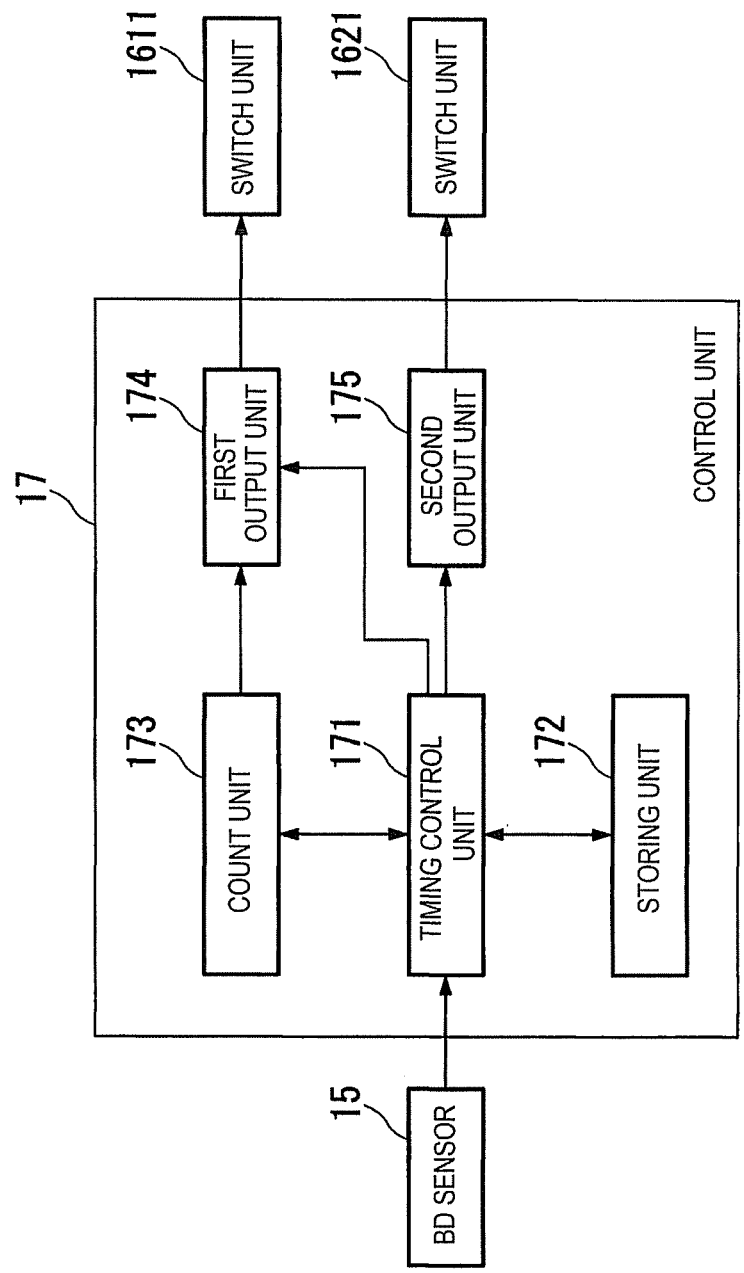
FIG. 3 is a diagram showing an example of the schematic configuration of a control unit in the embodiment.

FIG. 3 is a diagram showing an example of the schematic configuration of the control unit 17 in the embodiment.

As shown in FIG. 3, the control unit 17 includes a timing control unit 171, a storing unit 172, a count unit 173, a first output unit 174, and a second output unit 175.

If the timing control unit 171 detects the HSYNC supplied from the BD sensor 15, the timing control unit 171 reads a variable stored in the storing unit 172. If the read variable is 1, the timing control unit 171 outputs a count start signal to the count unit 173. If the read variable is 1, the timing control unit 171 outputs a signal release signal to the first output unit 174. If the read variable is 1, the timing control unit 171 outputs a signal generation signal to the second output unit 175. Thereafter, the timing control unit 171 resets the variable stored in the storing unit 172 to 0.

On the other hand, if the variable stored in the storing unit 172 is 0, the timing control unit 171 outputs the signal release signal to the second output unit 175. Thereafter, the timing control unit 171 sets the variable stored in the storing unit 172 to 1.

If the count unit 173 detects the count start signal supplied from the timing control unit 171, the count unit 173 counts up a count value N at every predetermined time. If the count value N reaches a predetermined value, the timing control unit 171 outputs the signal generation signal to the first output unit 174. The timing control unit 171 resets the count value N. The predetermined value is the count value N counted by the count unit 173 when the MEMS mirror 11 moves to the position C, the position B, the position A, and the position B in this order.

If the first output unit 174 detects the signal generation signal supplied from the timing control unit 171, the first output unit 174 outputs the first control signal to the switch unit 1611. If the first output unit 174 detects the signal release signal supplied from the timing control unit 171, the first output unit 174 stops the output of the first control signal to the switch unit 1611.

If the second output unit 175 detects the signal generation signal supplied from the timing control unit 171, the second output unit 175 outputs the second control signal to the switch unit 1621. If the second output unit 175 detects the signal release signal supplied from the timing control unit 171, the second output unit 175 stops the output of the second control signal to the switch unit 1621.

Figure 4:
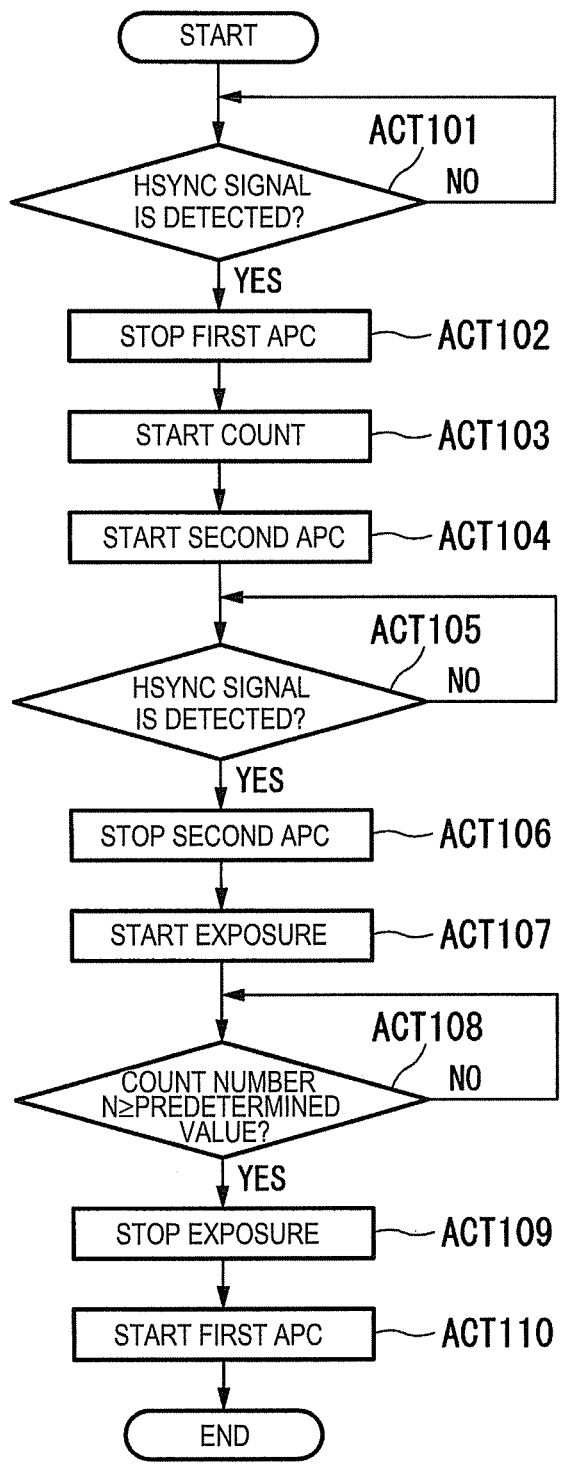
FIG. 4 is a flowchart for explaining processing of APC of light emitting units in the optical scanning device.

FIG. 4 is a flowchart for explaining processing of the APC of the light emitting unit 110 and the light emitting unit 111 in the optical scanning device 1 in the embodiment. FIG. 5 is a timing chart for explaining the processing of the APC of the light emitting unit 110 and the light emitting unit 111 in the optical scanning device 1 in the embodiment. Note that, for convenience of explanation, the explanation is started from a state in which the APC of the light emitting unit 110 is executed in the processing of the APC explained below. In the following explanation, the APC for a laser beam radiated by the light emitting unit 110 is sometimes referred to as first APC. The APC for a laser beam radiated by the light emitting unit 111 is sometimes referred to as second APC.

The control unit 17 determines whether the control unit 17 detects an HSYNC while executing the first APC (ACT 101). While the control unit 17 is performing the processing in ACT 101, the MEMS mirror 11 is located between the position B and the position C.

If the control unit 17 detects the HSYNC while executing the first APC, the control unit 17 stops the first APC (ACT 102). The supply of the HSYNC from the BD sensor 15 to the control unit 17 indicates that the MEMS mirror 11 reaches the position C. If the control unit 17 does not detect the HSYNC while executing the first APC, the control unit 17 executes the processing in ACT 101.

After stopping the first APC, the control unit 17 starts count-up of the count value N by the count unit 173 (Act 103). After starting the count-up by the count unit 173, the control unit 17 starts the second APC (ACT 104). The MEMS mirror 11 during the execution of the processing in Act 104 is located in the position C. Thereafter, the MEMS mirror 11 turns in the position D and moves toward the position C.

The control unit 17 determines whether the control unit 17 detects the HSYNC while executing the second APC (ACT 105). If the control unit 17 detects the HSYNC while executing the second APC, the control unit 17 stops the second APC (ACT 106). The supply of the HSYNC to the control unit 17 from the BD sensor 15 indicates that the MEMS mirror 11 turns in the position D and reaches the position C. If the control unit 17 does not detect the HSYNC while executing the second APC, the control unit 17 executes the processing in ACT 105.

After stopping the second APC, the control unit 17 starts exposure on the photoconductive drum (ACT 107). After the exposure is started, the MEMS mirror 11 moves to the position C and the position B in this order. The MEMS mirror 11 turns in the position A and moves toward the position B.

The control unit 17 determines whether the count value N reaches a predetermined value (ACT 108). If the count value N reaches the predetermined value, the control unit 17 stops the exposure on the photoconductive drum (ACT 109). Consequently, the effective image area H in this embodiment changes to a range in which the MEMS mirror 11 moves from the position C toward the position B, turns in the position A, and thereafter reaches the position B again.

If the count value N does not reach the predetermined value, the control unit 17 executes the processing in ACT 108. If the count value N reaches the predetermined value, this means that the MEMS mirror 11 reaches the position B. After stopping the exposure on the photoconductive drum, the control unit 17 starts the first APC (ACT 110). As explained above, the control unit 17 stops the first APC or the second APC every time the control unit 17 detects the HSYNC.

FIG. 6 is a timing chart for explaining processing of APC of two light emitting units in an optical scanning device in the past. The optical scanning device in the past detects an HSYNC to detect that the MEMS mirror 11 is located in the position C. The optical scanning device in the past detects the position of the MEMS mirror 11 according to count number N of a count unit. That is, the optical scanning device in the past resets the count number N when the HSYNC is detected and then counts up the count number N. The optical scanning device in the past determines the position of the MEMS mirror 11 according to a value of the counted-up count number N and executes the first APC and the second APC. However, if the count number N is reset, the position of the MEMS mirror 11 is unknown. Therefore, the optical scanning device in the past needs to execute the first APC and the second APC in advance before the count number N is reset. Therefore, the first APC is performed when the MEMS mirror 11 is located between the position A and the position B. That is, if the APC is performed on a plurality of laser beams, an effective image area in the optical scanning device in the past sometimes decreases. The optical scanning device 1 in this embodiment executes the second APC or the first APC at the time when the MEMS mirror 11 turns in the position D. Therefore, the optical scanning device 1 does not perform the APC when the MEMS mirror 11 is located between the position A and the position B. Therefore, the optical scanning device 1 can secure the effective image area wider than in the past.

As explained above, the optical scanning device 1 in this embodiment executes the second APC after the scanning and after the HSYNC is detected. That is, the optical scanning device 1 executes the second APC after the HSYNC is detected until the HSYNC is detected again when the MEMS mirror 11 turns to the other direction. Consequently, when laser beams from the two light emitting units 110 and 111 are used, it is possible to suppress the effective image area from decreasing.

Note that the optical scanning device 1 in the embodiment executes the second APC at the time when the MEMS mirror 11 turns in the position D. However, not only this, but, for example, the optical scanning device 1 may execute the first APC at the time when the MEMS mirror 11 turns in the position D. The optical scanning device 1 may execute the first APC and the second APC at the time when the MEMS mirror 11 turns in the position D.

The optical scanning device 1 in the embodiment detects the moving direction of the MEMS mirror 11 on the basis of the value of the variable stored in the storing unit 172. However, not only this, but, for example, the optical scanning device 1 may detect the moving direction of the MEMS mirror 11 from a rotating direction of the MEMS-mirror driving unit 14, which is an electric motor.

The optical scanning device 1 in the embodiment controls the stop and the start of the APC on the basis of the value of the variable stored in the storing unit 172 and the HSYNC. However, not only this, but, for example, the optical scanning device 1 may control the stop and the start of the APC at timing of a rising edge and at timing of a falling edge of the HSYNC.

The count unit 173 in the embodiment counts up the count number N. However, the count unit 173 may count down the count number N. The count unit 173 may start clocking when detecting the count start signal supplied from the timing control unit 171. In this case, the count number N is a clocked time.

In the embodiment, the operation range of the MEMS mirror is the range from the position A to the position D.

However, not only this, but, for example, a maximum position in one direction is represented as a position D and a maximum position in another direction is represented as position Z, which is a position ahead of the position A. In this case, the operation range of the MEMS mirror may be a range from the position Z to the position D. The exposure is not performed between the position A and the position Z.

In the optical scanning device 1 in the embodiment, the light source 10 includes the two beams. However, not only this, but the light source 10 may include a plurality of laser beams such as four or eight beams. In this case, the optical scanning device 1 performs the APC of at least one laser beam after the scanning and after the horizontal synchronization signal is detected. Consequently, it is possible to secure the effective image area wider than in the past.

According to the at least one embodiment explained above, if the optical scanning device uses a plurality of laser beams, the optical scanning device performs the APC of at least one laser beam after the HSYNC is detected. Consequently, it is possible to suppress the effective image area from decreasing compared with the past.

The functions of the control unit 17 in the embodiment explained above may be realized by a computer. In this case, a computer program for realizing the functions may be recorded in a non-transitory computer-readable recording medium and the functions may be realized by causing a computer system to read the computer program recorded in the recording medium and executing the computer program. Note that the "computer system" includes an OS and hardware such as peripheral apparatuses. The "computer-readable recording medium" means a portable medium such as a flexible disk, a magneto-optical disk, a ROM, or a CD-ROM or a storage device such as a hard disk incorporated in the computer system. Further, the "computer-readable recording medium" may include a medium that dynamically retains a computer program for a short time like a communication wire at the time when the computer program is transmitted via a network such as the Internet or a communication line such as a telephone line or a medium that retains the computer program for a fixed time like a volatile memory inside a computer system functioning as a server or a client in that case. The computer program may be a computer program for realizing a part of the functions or may be a computer program that can realize the functions in combination with a computer program already stored in the computer system.

The several embodiments are explained. However, the embodiments are presented as examples and are not intended to limit the scope of the invention. The embodiments can be implemented in other various forms. Various omissions, substitutions, and changes can be performed without departing from the spirit of the invention. The embodiments and modifications of the embodiments are included in the scope and the gist of the invention and included in the inventions described in claims and the scope of equivalents of the inventions.

What is claimed is:

1. An optical scanning device comprising:
   a light source that radiates a plurality of laser beams configured to scan a photoconductive drum, wherein the light source comprises a plurality of emitting units and one light receiving unit that receives a light beam from the plurality of emitting units;
   a MEMS mirror including a reflection surface that reflects the plurality of laser beams radiated from the light source;
   a MEMS-mirror driving unit configured to reciprocatingly move the MEMS mirror;
   a controller that performs auto power control for controlling respective light amounts of the plurality of laser beams radiated from the light source to predetermined values, wherein the controller performs control so as to emit one of the plurality of emitting units; and
   a sensor configured to supply a horizontal synchronization signal to the controller by detecting a laser beam reflected on the reflection surface when the MEMS mirror reaches a predetermined position, wherein
   after detecting the horizontal synchronization signal supplied from the sensor, the controller performs a first auto power control of the light amount of at least one laser beam among the plurality of laser beams, and wherein at least a second auto power control for light emitting units of the plurality of light emitting units which do not emit is not executed while the one of the plurality of light emitting units emit.

2. The device according to claim 1, wherein the controller performs the first auto power control of the light amount of the at least one laser beam after detecting the horizontal synchronization signal until detecting the horizontal synchronization signal again when the MEMS mirror turns from one direction to another direction.

3. The device according to claim 2, wherein the controller stops the first auto power control of the light amount of the at least one laser beam every time the controller detects the horizontal synchronization signal supplied from the sensor.

4. The device according to claim 1, wherein the controller comprises a switch unit, a comparator, and a capacitor.

5. The device according to claim 1, wherein the controller comprises a timing controller, a storing unit, a count unit, a first output unit, and a second output unit.

6. The device according to claim 1, wherein the first auto power control increases the light amount of at least one laser beam among the plurality of laser beams.

7. The device according to claim 1, wherein the first auto power control decreases the light amount of at least one laser beam among the plurality of laser beams.

8. The device according to claim 1, wherein the light source radiates at least two laser beams.

9. The device according to claim 1, wherein the light source radiates at least four laser beams.

10. The device according to claim 1, wherein the light source radiates at least eight laser beams.

11. An image forming apparatus comprising the optical scanning device according to claim 1.

12. A multifunctional peripheral apparatus comprising the optical scanning device according to claim 1.

13. An optical scanning method of an optical scanning device including a light source that radiates a plurality of laser beams, the light source comprises a plurality of emitting units and one light receiving unit, a MEMS mirror including a reflection surface configured to reflects the plurality of laser beams radiated from the light source, a MEMS-mirror driving unit configured to reciprocatingly move the MEMS mirror, and a sensor configured to output a horizontal synchronization signal by detecting a laser beam reflected on the reflection surface when the MEMS mirror reaches a predetermined position,
   the optical scanning method comprising, after detecting, in one direction of the reciprocating movement of the MEMS mirror, the horizontal synchronization signal output from the sensor, controlling a light amount of at least one laser beam among the plurality of laser beams to a predetermined value, controlling to emit one of the plurality of light emitting units, and executing a first auto power control for the one of the plurality of light emitting units that emit while not executing at least a second auto power control for other light emitting units of the plurality of light emitting units that do not emit.

14. The method according to claim 13, wherein the control unit performs the first auto power control of the light amount of the at least one laser beam after detecting the horizontal synchronization signal until detecting the horizontal synchronization signal again when the MEMS mirror turns from one direction to another direction.

15. The method according to claim 14, wherein the control unit stops the first auto power control of the light amount of the at least one laser beam every time the control unit detects the horizontal synchronization signal supplied from the sensor.

16. The method according to claim 13, wherein the first auto power control increases the light amount of at least one laser beam among the plurality of laser beams.

17. The method according to claim 13, wherein the first auto power control decreases the light amount of at least one laser beam among the plurality of laser beams.

18. The method according to claim 13, wherein the light source radiates at least two laser beams.

19. The method according to claim 13, wherein the light source radiates at least four laser beams.

20. The method according to claim 13, wherein the light source radiates at least eight laser beams.

* * * * *